United States Patent
Hernandez Santos et al.

(10) Patent No.: US 12,373,608 B2
(45) Date of Patent: Jul. 29, 2025

(54) ROLE-BASED COMPONENT ACCESS CONTROL

(71) Applicant: LENOVO GLOBAL TECHNOLOGY (UNITED STATES) INC., Morrisville, NC (US)

(72) Inventors: Manuel R. Hernandez Santos, Durham, NC (US); Keith M. Campbell, Cary, NC (US); Eric Pettersen, Raleigh, NC (US); Clifton E. Kerr, Morrisville, NC (US); Christopher L. Wood, Chapel Hill, NC (US); Steven L. Vanderlinden, Hillsborough, NC (US)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 465 days.

(21) Appl. No.: 17/363,427

(22) Filed: Jun. 30, 2021

(65) Prior Publication Data
US 2023/0004679 A1    Jan. 5, 2023

(51) Int. Cl.
*G06F 21/70*    (2013.01)
(52) U.S. Cl.
CPC .................................. *G06F 21/70* (2013.01)

(58) Field of Classification Search
CPC .. G06F 21/70; G06F 2221/2141; G06F 21/62; G06F 21/44
See application file for complete search history.

(56) References Cited

U.S. PATENT DOCUMENTS

| | | | |
|---|---|---|---|
| 2014/0298490 A1* | 10/2014 | Clark | G06Q 10/105 726/34 |
| 2016/0260273 A1* | 9/2016 | Clark | G06F 21/70 |
| 2017/0039789 A1* | 2/2017 | Neely | H04L 63/20 |
| 2018/0012043 A1* | 1/2018 | Kupiec | H04L 63/0428 |
| 2019/0069436 A1* | 2/2019 | Norton | H05K 7/1498 |
| 2019/0251765 A1* | 8/2019 | Masters | H04L 63/105 |

* cited by examiner

*Primary Examiner* — Baotran N To (57) ABSTRACT

Component access control includes: receiving, by an access control module, permissions specifying authorization of physical access to one or more secured components of a computing system by one or more requestors; receiving, by the access control module from a requestor, a request to physically access one of the secured components of the computing system; determining, by the access control module based on the permissions, whether the requestor is authorized to physically access the secured component; and responsive to determining that the requestor is authorized to physically access the secured component, granting the requestor physical access to the secured component while prohibiting the requestor from physically accessing other secured components of the computing system.

17 Claims, 5 Drawing Sheets

ROLE-BASED COMPONENT ACCESS CONTROL

BACKGROUND

Field of the Disclosure

The field of the disclosure is data processing, or, more specifically, methods, apparatus, and products for component access control.

Description of Related Art

Modern computing systems include many different system components. When a computing system requires service of one or more of these components, service personnel must access these components within the computing system. During such services, components other than those being serviced are often accessible to service personnel and, as such, are vulnerable to potential undesirable actions by the service personnel.

SUMMARY

Methods, apparatus, and products for component access control according to various embodiments are disclosed in this specification. Such component access control may include: receiving, by an access control module, permissions specifying authorization of physical access to one or more secured components of a computing system by one or more requestors; receiving, by the access control module from a requestor, a request to physically access one of the secured components of the computing system; determining, by the access control module based on the permissions, whether the requestor is authorized to physically access the secured component; and responsive to determining that the requestor is authorized to physically access the secured component, granting the requestor physical access to the secured component while prohibiting the requestor from physically accessing other secured components of the computing system.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
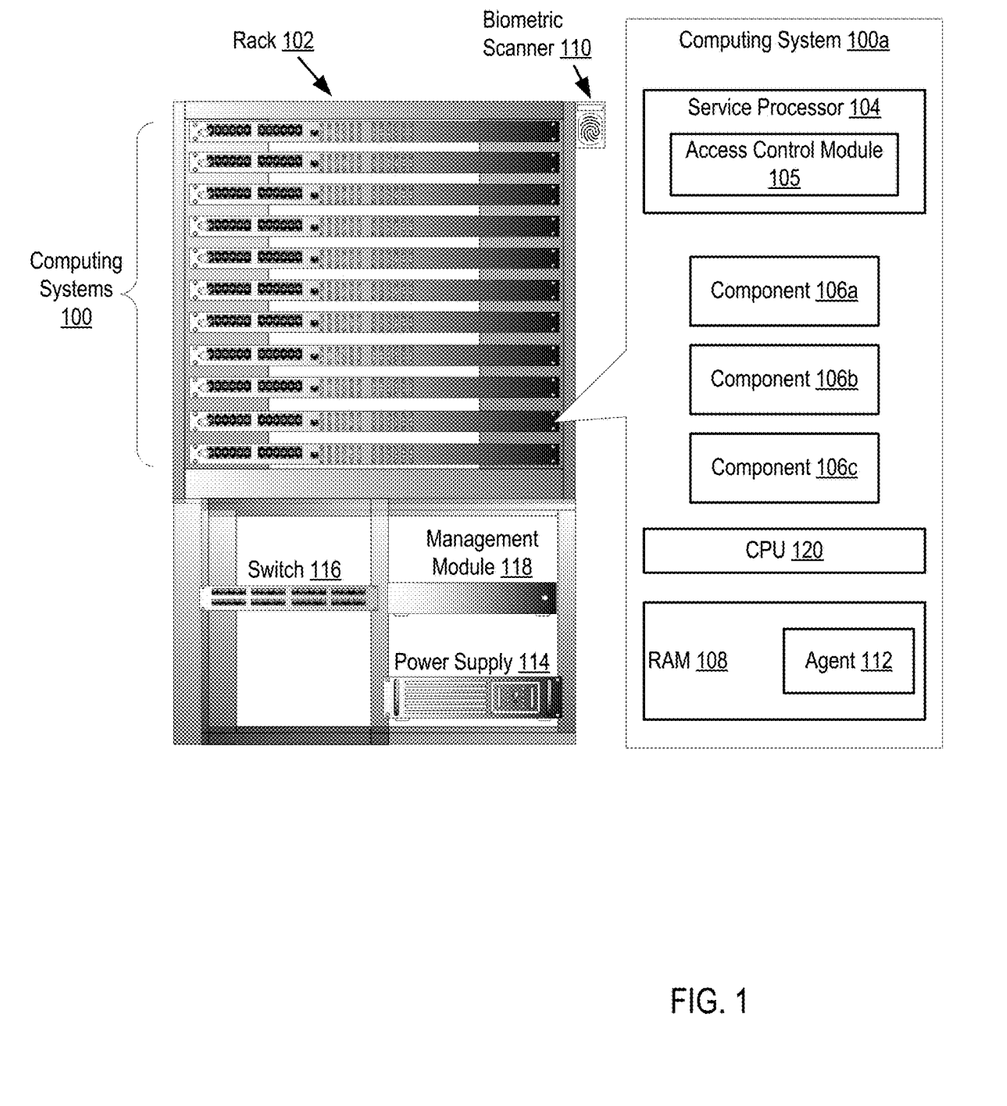
FIG. 1 shows an example line drawing of a rack mounted system configured for component access control in accordance with embodiments of the present disclosure.

Exemplary methods, apparatus, and products for component access control in accordance with the present disclosure are described with reference to the accompanying drawings, beginning with FIG. 1. FIG. 1 sets forth an example line drawing of a rack mounted system configured for component access control in accordance with embodiments of the present disclosure. The example system of FIG. 1 includes a rack 102, such as a standard 19 inch rack for mounting multiple electronic equipment modules.

The example rack 102 of FIG. 1 includes a number of computing systems 100, a biometric scanner 110, a power supply 114, a switch 116, and a management module 118. The computing systems 100 include software and hardware capable of computing functions, and may be embodied as a server, workstation, storage array, and the like. The biometric scanner 110 may be implemented as hardware used to capture a biometric signature (such as a finger print, vocal pattern, retinal scan and the like) for verification of identity. The biometric scanner may also operate as a locking mechanism that approves or denies access to one or more components of the computing systems 100 by matching the biometric signature against authorized signatures stored in a database. The power supply 114 converts mains AC power to low-voltage regulated DC power for the internal components of the rack 102. The switch 116 may be a network switch that connects components within the rack 102 to a computer network. The management module 118 provides system-management functions and is used for configuring and managing the installed components of the rack 102.

Each of the computing systems 100 in the example of FIG. 1 includes a number of components. Examples of components 106a-c may include CPUs, fans, DIMM slots, a power supply, and the like.

Computing system 100a is depicted in further detail as an example of one of the computing systems 100. The example computing system 100a of FIG. 1 includes a number of components 106a-106c, a service processor 104, a central processing unit ('CPU') 120, and main computer memory in the form of RAM ('Random Access Memory') 108. Stored in RAM 108 is an agent 112 and the service processor 104 is executing an access control module 105.

The computing system (100a) is configured for component access control in accordance with embodiments of the present disclosure. The term 'access control' refers to controlling whether a user is authorized to access a component and the type of access the user is authorized (e.g., a duration of access). Access control at the component level allows only authorized users access to a subset of (one or more) components within a computing system while prohibiting those users access to other components of the computing system. That is, access control at the component level provides fine grained security of components within computing systems. Examples of users that may be allowed access to a component within the computing system 100a are service personnel, system administrators, and the like.

Each of the components of the computing system 100a may be secured in a variety of manners. The term 'secured' here may refer to physical or virtual (software-based) access as the context requires. For example, hardware components within the computing system 100a may be physically secured by a cover or lid that locks in place, and physically separated from other components within the computing system 100a by physical partitions. In another example, software or firmware components may be secured from access by logical locks or passwords.

Access to each of the secured components of the computing system may be allowed through the use of a lock that requires a key, passcode, biometric signature, or the like. For example, a requestor, such as a user, may request access to a component of a computing system by scanning their fingerprint, or other biometric signature, at a biometric scanner, such as the biometric scanner 110 of FIG. 1. The lock or biometric scanner may unlock the cover or lid securing the component for which access is requested, based on a determination of whether the requestor is authorized to physically access the secured component.

A computing system configured according to embodiments of the present disclosure for access control at the component level may include a lock or biometric scanner for each respective component included within the computing system. In such a computing system, the locks or biometric scanners may be positioned local to each respective component of the computing system, grouped together in an array that is positioned local to the computing system, or located remotely from the computing system entirely. A computing system configured for access control at the component level may include only a single lock or biometric scanner for the computing system. In such a computing system, the request for access may be made through the use of the single biometric scanner, and access may be granted only to the components for which the requestor is authorized, while the other components will remain secured.

Access control may also be applied to a rack 102 as shown in FIG. 1 at the computing system level, where each of the computing systems 100 is secured from access. In such an example, the requestor may request access, through utilizing a biometric scanner 110 local to the rack 102, to a particular computing system within the rack, and may only access the computing system for which the requestor is authorized.

The example service processor 104 of the computing system 100*a* may execute a module of computing program instructions comprising an access control module 105 according to embodiments of the present disclosure. That is, the service processor may implement an access control module 105. The example access control module 105 may be configured to receive permissions specifying authorization of physical access to one or more secured components of a computing system by one or more requestors. The access control module 105 may receive such permissions from a system-wide management module (not shown in FIG. 1) that provides an interface for system administrators or other users to manage various aspects of computing systems 100 as well as computing systems of other racks in, for example, a data center. Such permissions may specify both role based and time based controls over which components are authorized for access.

Role based controls, for example, may specify which components within the computing system a requestor is allowed to access based on the role or type of requestor, such as an administrator, a type of service personnel, and the like. In such an example, the permissions may specify that an administrator-level requestor has access to many components, while a requestor, whose role is a technical service personnel, is allowed access only to the component to be serviced. In another example of role based controls, permissions may specify which components within the computing system a requestor is allowed to access based on a type of service required in the computing system. In such an example, the permissions may specify that a requestor whose role is service personnel to carry out a particular service on the computing system is allowed access only to the components required for the service. The permissions for each requestor may be in the form of a temporary account created for use by the service personnel upon determining a service to be carried out and may be deleted after the service is completed.

Time based controls may specify a time window for which a requestor is allowed access to one or more components, such as a length of time in which access is allowed, a start and end time during a specified date, and the like. The time window for which a requestor is allowed access may be based on the type of service required, the role or type of requestor that is requesting access, and the like. For example, while system administrators may be allowed access to any component and at any point during the day, service personnel carrying out a service on a computing system's CPU may only be allowed access to the CPU, and only for a specified length of time. In such an example, the specified length of time may be determined based on an expected time of service, an admin selected time, a time selected for optimization of the computing system, and the like. In an example embodiment of the present disclosure, the permissions could specify two different requestors that each are authorized access to different components within the same computing system with overlapping time windows.

Figure 2:
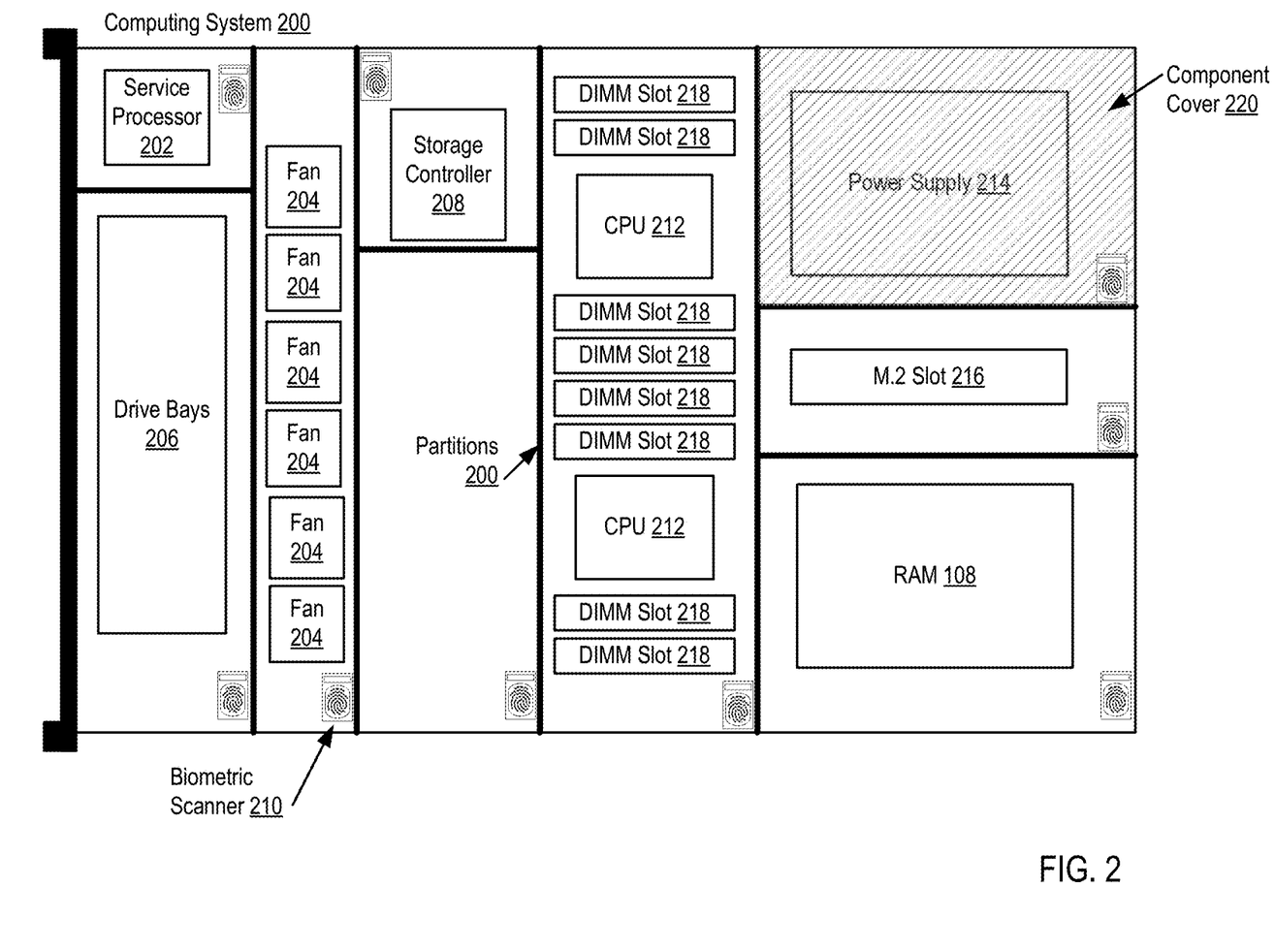
FIG. 2 shows an example line drawing of a computing system configured for component access control in accordance with embodiments of the present disclosure.

The example access control module 105 of the services processor 104 of FIG. 2 may receive, from a requestor, a request to physically access one of the secured components of the computing system 100*a*. The access control module 105 may then determine, based on the received permissions described above, whether the requestor is authorized to physically access the secured component. Responsive to determining that the requestor is authorized to physically access the secured component, the access control module 105 of the service processor 104 may then grant the requestor physical access to the secured component while prohibiting the requestor from physically accessing other secured components of the computing system. Prohibiting the requestor from physically accessing other secured components of the computing system may be carried out by only unlocking the component for which the requestor requested access to and is authorized to access, and keeping the remaining components locked and therefore inaccessible to the requestor.

The service processor 104 may track all access actions and service actions in a log, which may be stored local to the service processor, local to the computing system, or remote from the computing system. Such a log may compare expected events versus performed events. Readers of skill in the art will recognize that such a log will aid in auditing of the computing system.

The service processor 104 may issue alerts when unauthorized access or events occurs, and lock some or all system components once an unauthorized access event occurs. For example, the service processor may temporarily block or remove all permissions for some or all components of a computing system when an unauthorized access or event occurs, such as for a specified time, until an admin or other approved account restores the system permissions, or the like. The service processor 104 may also generate temporary credentials to access a physical or logical component, exposes a section on a web interface for credentials management and actions customization, expose a secure API, to automate credentials generation, and communicate with BIOS/UEFI (Basic Input/Output Service or Unified Extensible Firmware Interface) to coordinate the authorization of certain actions.

The arrangement of servers and other devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Component access control in accordance with the present disclosure is generally implemented with computing systems, such as computing systems 100 shown in FIG. 1. For further explanation, therefore, FIG. 2 sets forth a block diagram of an example computing system 200 configured for component access control according to embodiments of the present disclosure. The computing system 200 of FIG. 2 includes a service processor 202, multiple fans 204, drive bays 206, one or more CPUs 212, multiple DIMM (dual in-line memory module) slots 218, a power supply 214, an M.2 slot 216, and RAM 108. The computing system 200 may include other components than those shown in FIG. 2, such as SSDs (solid state drives), network ports, NVMe (Non-Volatile Memory Express) connectors, and the like.

The computing system 200 of FIG. 2 also includes partitions 220 configured for physically separating each of the multiple components included within the computing system 200. The computing system 200 of FIG. 2 also includes a component cover 220 positioned over each component within the computing system. For example, each component within the computing system 200 may be individually physically secured by partitions 220 and a component cover 220. The component cover 220 may be opened or removed to provide access to its respective component or components positioned beneath the component cover 220.

The computing system 200 of FIG. 2 also includes a biometric scanner 210 positioned at each component within the computing system. A biometric scanner 210 may be positioned on top of, or local to, each component cover 220 of the computing system, such that a requestor may only access a component through its respective component cover 220 via utilization of a respective biometric scanner 210.

Figure 3:
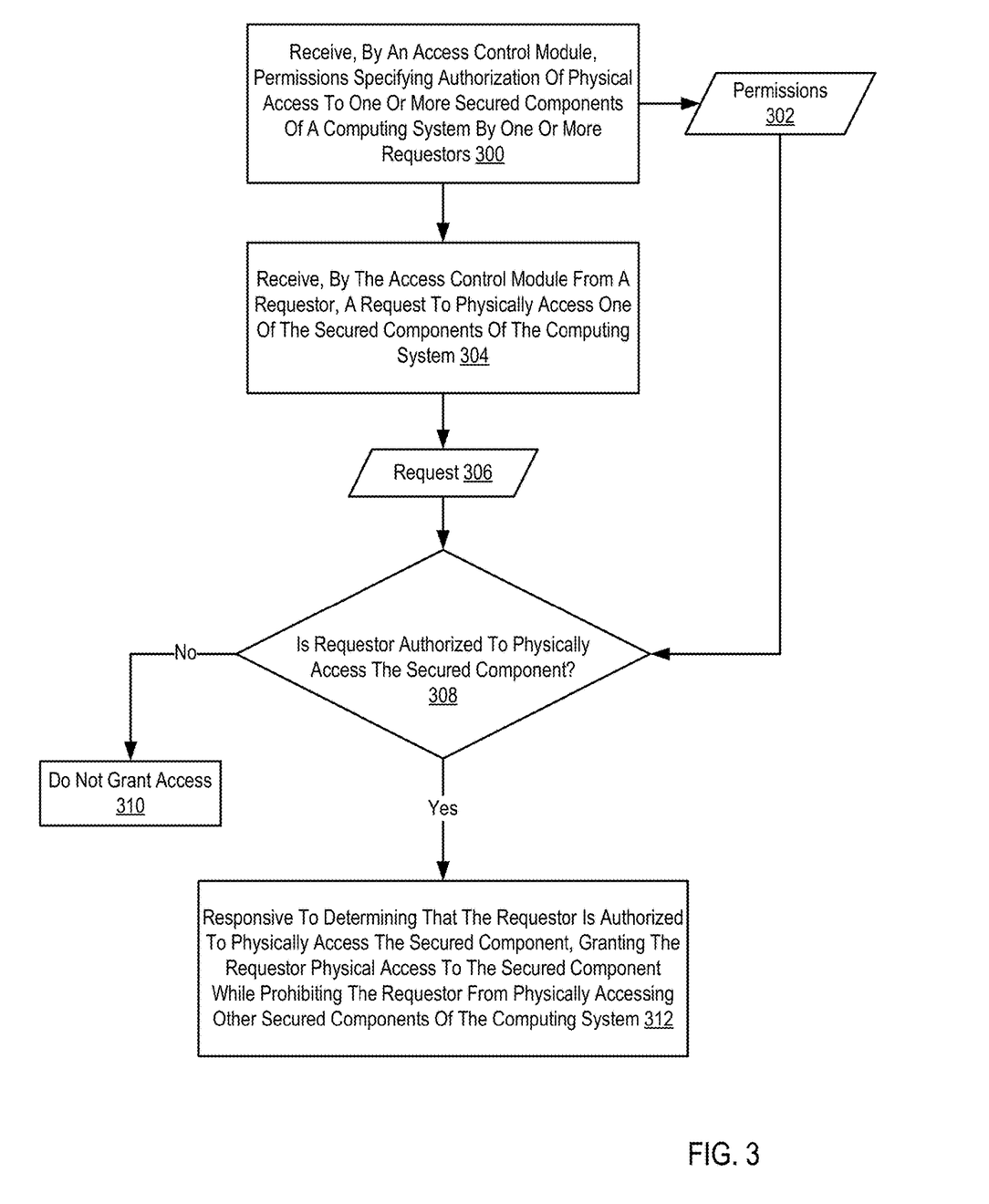
FIG. 3 is a flowchart of an example method for component access control according to some embodiments of the present disclosure.

For further explanation, FIG. 3 sets forth a flow chart illustrating an exemplary method of component access control according to embodiments of the present disclosure. The method of FIG. 3 includes receiving 300, by an access control module 105, permissions 302 specifying authorization of physical access to one or more secured components of a computing system by one or more requestors. Receiving 300 permissions 302 specifying authorization of physical access to one or more secured components of a computing system by one or more requestors may be carried out by receiving, by the access control module, the permission from a system-wide management module. The permissions 302 may specify a recognized user or personnel via a password, biometric signature, or the like, and may further specify corresponding components for which the user is authorized to access. The permissions 302 may specify a time window for which the authorization is permitted, such as a length of time in which access is allowed, a start and end time during a specified date, and the like. The received permissions 302 may be stored locally in a database within memory of the service processor, in memory local to the computing system, or remote from the computing system.

The method of FIG. 3 also includes receiving 304, by the access control module 105 from a requestor, a request 306 to physically access one of the secured components of the computing system. Receiving 304 a request 306 to physically access one of the secured components of the computing system may be carried out by the access control module receiving the request from a requestor. The request may be in the form of a password, a key or key card, a biometric signature, and the like. Examples of a requestor may include a user or a service person, an administrator, or the like. The request may be a request to access one or more components of the computing system at once.

The method of FIG. 3 also includes determining 308, by the access control module 105 based on the permissions 302, whether the requestor is authorized to physically access the secured component. Determining 308 whether the requestor is authorized to physically access the secured component may be carried out by the service processor or access control module and based on the received permissions and the received request. For example, the received request may be compared with the previously received permissions in order to determine whether the requestor is authorized to physically access the secured component.

The method of FIG. 3 also includes, responsive to determining 308 that the requestor is authorized to physically access the secured component, granting 312 the requestor physical access to the secured component while prohibiting the requestor from physically accessing other secured components of the computing system. Granting 312 the requestor physical access to the secured component while prohibiting the requestor from physically accessing other secured components of the computing system may be carried out by unlocking or opening a component cover securing the component.

Figure 4:
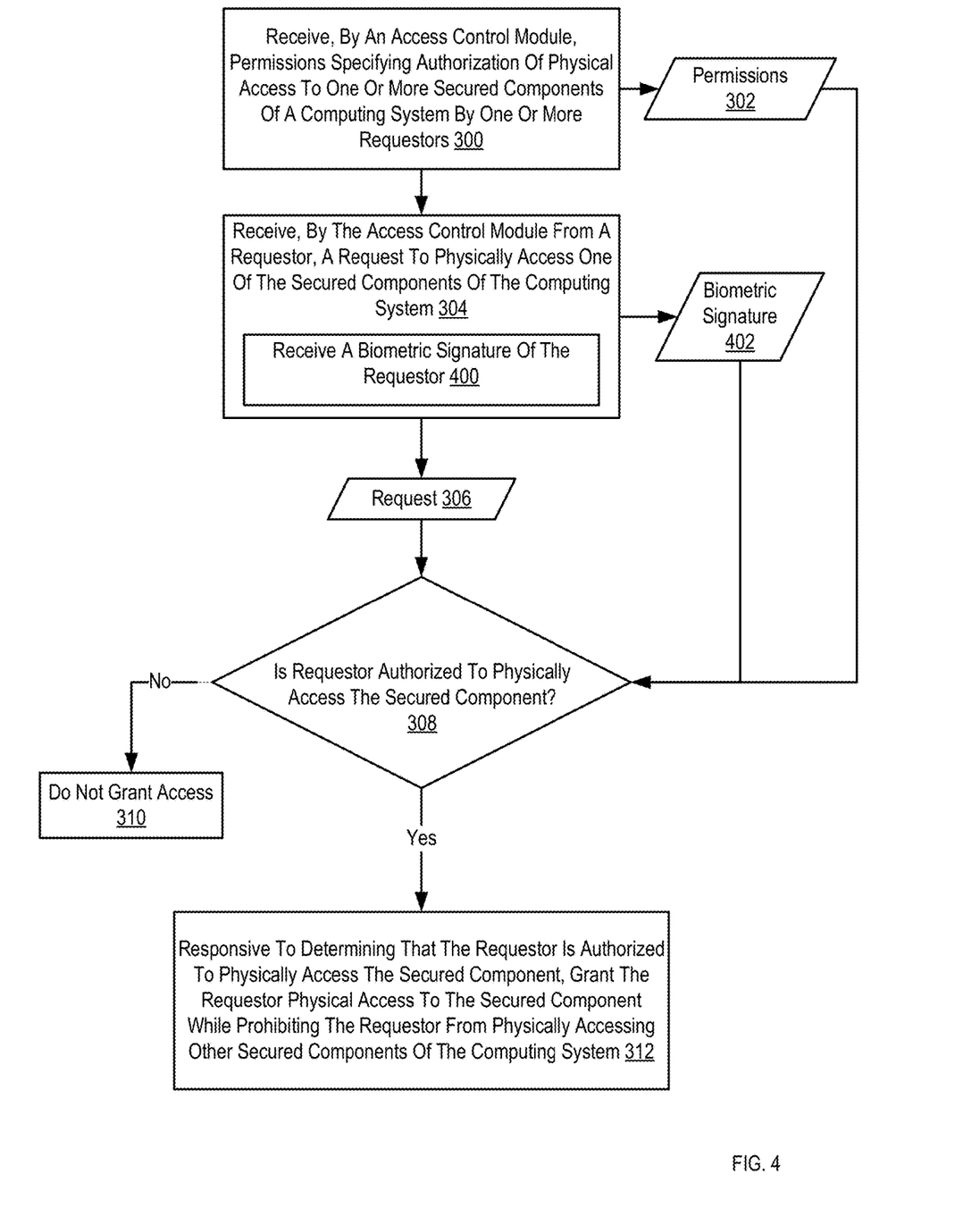
FIG. 4 is a flowchart of an example method for component access control according to some embodiments of the present disclosure.

For further explanation, FIG. 4 sets forth a flow chart illustrating a further exemplary method of component access control according to embodiments of the present disclosure. The method of FIG. 4 is similar to the method of FIG. 3 in that the method of FIG. 4 also includes: receiving 300, by an access control module 105, permissions 302 specifying authorization of physical access to one or more secured components of a computing system by one or more requestors; receiving 304, by the access control module 105 from a requestor, a request 306 to physically access one of the secured components of the computing system; determining 308, by the access control module 105 based on the permissions 302, whether the requestor is authorized to physically access the secured component; and responsive to determining 308 that the requestor is authorized to physically access the secured component, granting 312 the requestor physical access to the secured component while prohibiting the requestor from physically accessing other secured components of the computing system.

The method of FIG. 4 differs from the method of FIG. 3, however, in that the method of FIG. 4 also includes receiving 400, by the access control module 105 from a requestor, a biometric signature 402 of the requestor. Receiving 400 a biometric signature 402 of the requestor may be carried out by the access control module receiving the biometric signature 402 from the requestor along with the request. Examples of a biometric signature may include a fingerprint, a scan of an iris, a voice signature, an image of a face of the requestor for facial recognition, and the like. The biometric signature 402 may be received 400 via a biometric scanner 210 such as those described in FIG. 2. The biometric signature 402 may be received at a location local to the component for which access is being requested, at a location local to the computing system, or remote from the computing system.

The method of FIG. 4 may also include determining 308, by the access control module 105 based on the permissions 302 and the biometric signature 402, whether the requestor is authorized to physically access the secured component. Determining 308 whether the requestor is authorized to physically access the secured component may be carried out by the service processor or access control module and based on the received permissions 302, the received request 306, and the received biometric signature 402. For example, the received biometric signature may be compared with the previously received permissions in order to identify the requestor and determine whether the identified requestor is authorized to physically access the secured component. For example, access to a component within the computing system may be granted to the requestor in response to determining that the received biometric signature identifies the requestor, according to the received permissions, as one that is authorized to access the component. The received permissions may specify a time window for which a requestor is allowed access, such as a length of time in which access is allowed, a start and end time during a specified date, and the like. For example, a requestor that requests access to a component outside a specified time window will not be granted access to the component. In such an example, the biometric signature 402 may expire, and therefore no longer be effective to grant access to the requestor, after a specified time according to the permissions.

Figure 5:
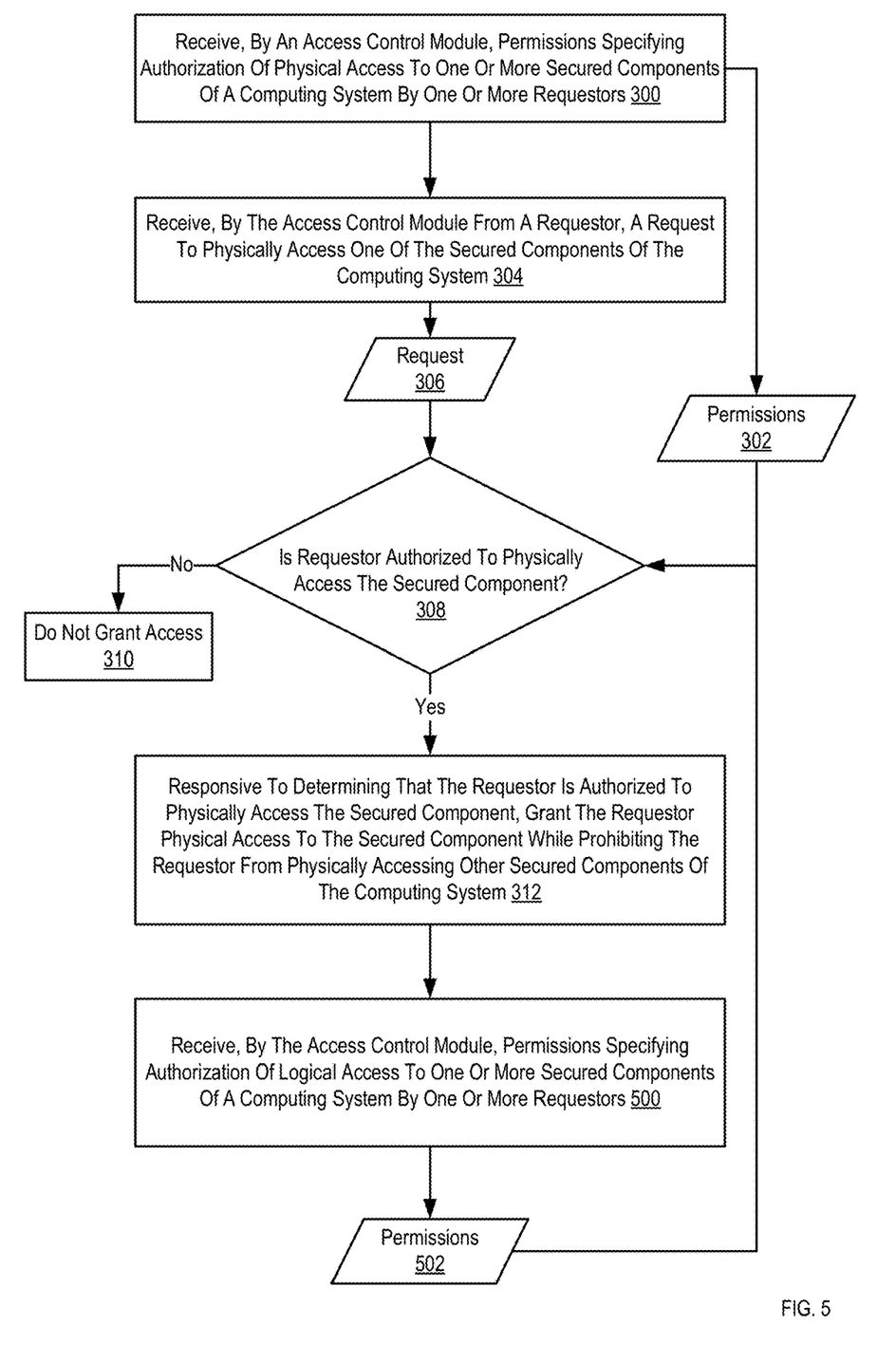
FIG. 5 is a flowchart of an example method for component access control according to some embodiments of the present disclosure.

For further explanation, FIG. 5 sets forth a flow chart illustrating a further exemplary method of component access control according to embodiments of the present disclosure. The method of FIG. 5 is similar to the method of FIG. 3 in that the method of FIG. 5 also includes; receiving 300, by an access control module 105, permissions 302 specifying authorization of physical access to one or more secured components of a computing system by one or more requestors; receiving 304, by the access control module 105 from a requestor, a request 306 to physically access one of the secured components of the computing system; determining 308, by the access control module 105 based on the permissions 302, whether the requestor is authorized to physically access the secured component; and responsive to determining 308 that the requestor is authorized to physically access the secured component, granting 312 the requestor physical access to the secured component while prohibiting the requestor from physically accessing other secured components of the computing system.

The method of FIG. 5 differs from the method of FIG. 3, however, in that the method of FIG. 5 also includes receiving 500, by the access control module 105, permissions 502 specifying authorization of logical access to one or more secured components of a computing system by one or more requestors. Receiving 500 permissions 502 specifying authorization of logical access to one or more secured components of a computing system by one or more requestors may be carried out by receiving, by the access control module, the permission from a system-wide management module. The permissions 502 may specify a recognized user or personnel via a password, biometric signature, or the like, and may further specify corresponding logical components for which the user is authorized to access. The permissions 502 may specify a time window for which the authorization is permitted, such as a length of time in which access is allowed, a start and end time during a specified date, and the like. The received permissions 502 may be stored locally in a database within memory of the service processor, in memory local to the computing system, or remote from the computing system. Examples of logical access include access to data, computing resources, and sub-systems within the computing system. Receiving the permissions 502 may occur concurrently or consecutively to receiving permissions 302.

In view of the explanations set forth above, readers will recognize that the benefits of component access control according to embodiments of the present disclosure include:
Increased security for computing systems at the component level due to authorization requirements for each component.
Increased system reliability by reducing the likelihood of unauthorized access by service personnel, thereby decreasing threats or undesirable actions made to the computing system.
Improved reliability by maintaining an auditable service log of access and service actions for the computing system at the component level.

Exemplary embodiments of the present disclosure are described largely in the context of a fully functional computer system for component access control. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will also recognize that, although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of component access control, the method comprising:
   receiving, by an access control module, permissions specifying authorization of physical access to a plurality of secured components of a computing system by a plurality of requestors, wherein the permissions specifying authorization of physical access indicate for each requestor a predefined period of time to access one or more of the plurality of secured components, and wherein the predefined period of time for each requestor is specified based on a type of task to be performed by that requestor;
   receiving, by the access control module from a first requestor, a request to physically access a first secured component of the plurality of secured components of the computing system;
   determining, by the access control module based on the permissions, whether the first requestor is authorized to physically access the first secured component; and
   responsive to determining that the first requestor is authorized to physically access the first secured component, granting the first requestor physical access to the first secured component for the predefined period of time indicated by the permissions for the first requestor to access the first secured component while prohibiting the first requestor from physically accessing at least one other secured component of the computing system.

2. The method of claim 1, wherein the predefined period of time specified within the permissions is based on roles to which requestors are assigned.

3. The method of claim 1, wherein receiving the request to physically access one of the secured components of the computing system further comprises receiving a biometric signature of the first requestor.

4. The method of claim 1, further comprising:
receiving, by the access control module, permissions specifying authorization of logical access to one or more secured components of a computing system by one or more requestors.

5. The method of claim 1, wherein the access control module comprises a service processor.

6. The method of claim 1, wherein the access control module further comprises an agent in software.

7. An apparatus for role-based component access control, the apparatus comprising a computer processor, a computer memory operatively coupled to the computer processor, the computer memory having disposed within it computer program instructions that, when executed by the computer processor, cause the apparatus to carry out the steps of:
receiving, by an access control module, permissions specifying authorization of physical access to a plurality of secured components of a computing system by a plurality of requestors, wherein the permissions specifying authorization of physical access indicate for each requestor a predefined period of time to access one or more of the plurality of secured components, and wherein the predefined period of time for each requestor is specified based on a type of task to be performed by that requestor;
receiving, by the access control module from a first requestor, a request to physically access a first secured component of the plurality of secured components of the computing system;
determining, by the access control module based on the permissions, whether the first requestor is authorized to physically access the first secured component; and
responsive to determining that the first requestor is authorized to physically access the first secured component, granting the first requestor physical access to the first secured component for the predefined period of time indicated by the permissions for the first requestor to access the first secured component while prohibiting the first requestor from physically accessing at least one other secured component of the computing system.

8. The apparatus of claim 7, wherein the predefined period of time specified within the permissions is based on roles to which requestors are assigned.

9. The apparatus of claim 7, wherein receiving the request to physically access one of the secured components of the computing system further comprises receiving a biometric signature of the first requestor.

10. The apparatus of claim 7, further comprising:
receiving, by the access control module, permissions specifying authorization of logical access to one or more secured components of a computing system by one or more requestors.

11. The apparatus of claim 7, wherein the access control module comprises a service processor.

12. The apparatus of claim 7, wherein the access control module further comprises an agent in software.

13. A computer program product for role-based component access control, the computer program product comprising a non-volatile computer readable storage medium with computer program instructions stored thereon that, when executed, cause a computer to carry out the steps of:
receiving, by an access control module, permissions specifying authorization of physical access to one or more a plurality of secured components of a computing system by a plurality of requestors, wherein the permissions specifying authorization of physical access indicate for each requestor a predefined period of time to access one or more of the plurality of secured components, and wherein the predefined period of time for each requestor is specified based on a type of task to be performed by that requestor;
receiving, by the access control module from a first requestor, a request to physically access a first secured component of the plurality of secured components of the computing system;
determining, by the access control module based on the permissions, whether the first requestor is authorized to physically access the first secured component; and
responsive to determining that the first requestor is authorized to physically access the first secured component, granting the first requestor physical access to the first secured component for the predefined period of time indicated by the permissions for the first requestor to access the first secured component while prohibiting the first requestor from physically accessing at least one other secured component of the computing system.

14. The computer program product of claim 13, wherein the predefined period of time specified within the permissions is based on roles to which requestors are assigned.

15. The computer program product of claim 13, wherein receiving the request to physically access one of the secured components of the computing system further comprises receiving a biometric signature of the first requestor.

16. The method of claim 1, wherein the permissions indicate that the first requestor has physical access to the first secured component of the computing system for a first predefined period of time, and wherein the permissions indicate that a second requestor has physical access to the first secured component of the computing system for a second predefined period of time that is different than the first predefined period of time.

17. The method of claim 16, wherein the first predefined period of time is longer than the second predefined period of time.

* * * * *